(12) United States Patent
Marripudi et al.

(10) Patent No.: US 7,644,204 B2
(45) Date of Patent: Jan. 5, 2010

(54) SCSI I/O COORDINATOR (75) Inventors: Gunneswara R. Marripudi, Santa Clara, CA (US); Satheesh Kumar Nanniyur Krishnamourthy, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 357 days.

(21) Appl. No.: 11/554,838

(22) Filed: Oct. 31, 2006

(65) Prior Publication Data

US 2008/0147893 A1    Jun. 19, 2008

(51) Int. Cl.
*G06F 3/00* (2006.01)
*G06F 13/00* (2006.01)
*G06F 13/12* (2006.01)

(52) U.S. Cl. .............................. 710/40; 710/5; 710/31; 710/33; 710/62

(58) Field of Classification Search .................. None
See application file for complete search history.

(56) References Cited

U.S. PATENT DOCUMENTS

| | | | |
|---|---|---|---|
| 5,819,056 A | 10/1998 | Favor | |
| 5,890,207 A | 3/1999 | Sne et al. | |
| 5,930,483 A | 7/1999 | Cummings et al. | |
| 6,154,810 A | 11/2000 | Derby et al. | |
| 6,230,240 B1 | 5/2001 | Shrader et al. | |
| 6,460,122 B1 | 10/2002 | Otterness et al. | |
| 6,484,234 B1 | 11/2002 | Kedem | |
| 6,567,888 B2 | 5/2003 | Kedem | |
| 7,016,991 B2 | 3/2006 | Yamamoto | |
| 7,024,523 B1 | 4/2006 | Young | |
| 7,035,950 B2 | 4/2006 | Yamamoto | |
| 7,054,923 B2 | 5/2006 | Krishnamoorthy | |
| 7,062,608 B2 | 6/2006 | Le Moal et al. | |
| 7,099,962 B2 | 8/2006 | Nakayama et al. | |
| 7,111,129 B2 | 9/2006 | Percival | |
| 2003/0028724 A1 | 2/2003 | Kedem | |
| 2004/0267902 A1 | 12/2004 | Yang | |
| 2005/0053060 A1 | 3/2005 | Pettey | |
| 2005/0060226 A1 | 3/2005 | Heithoff et al. | |
| 2005/0081010 A1* | 4/2005 | DeWitt et al. ............... 711/165 |
| 2005/0165985 A1* | 7/2005 | Vangal et al. ............... 710/107 |
| 2006/0031602 A1 | 2/2006 | Ellis et al. | |
| 2006/0193318 A1 | 8/2006 | Narasimhan et al. | |

OTHER PUBLICATIONS

IONA Technologies PLC, Application Client Programming, iPortal Application Server Developer's Guide, http://ww.iona.com/support/docs/iportal_application_server/3.0/DevelopGuide/html/Intro-Java.html.
Wikipedia, Buffer Credits, http://en.wikipedia.org/wiki/Buffer_credits, 2006.
McData, Buffer-to-Buffer Credits and Their Effect on FICON Performance, www.mcdata.com, 2006.

(Continued)

*Primary Examiner*—Alan Chen (57) ABSTRACT

A Small Computer System Interface (SCSI) input/output (I/O) coordinator of an apparatus in an example caches in memory local to the SCSI I/O coordinator one or more I/O request contexts stored in memory non-local to the SCSI I/O coordinator.

11 Claims, 7 Drawing Sheets

OTHER PUBLICATIONS

Wikipedia, Cache, http://en.wikipedia.org/wiki/Caching, 2006.
LostCircuits, Tech Advice Guide, http://lostcircuits.com/hdd/hdd8/4.shtml.
Wikipedia, Comparison of latency and throughput, http://en.wikipedia.org/wiki/Comparison_of_latency_and_bandwidth, 2006.
Wikipedia, Context switch, http://en.wikipedia.org/wiki/Context_switch, 2006.
Wikipedia, Device Driver, http://en.wikipedia.org/wiki/Devide_driver, 2006.
Kenneth W. Preslan, et al., Device Locks: Mutual Exclusion for Storage Area Networks, p. 262-74.
Wikipedia, Disk Array, http://en.wikipedia.org/wiki/Disk_array, 2006.
Wikipedia, Disk Array Controller, http://en.wikipedia.org/wiki/Disk_array_controller, 2006.
Scott Cromar, Princeton University, Unix Systems, Disk I/O, http://www.princeton.edu/~unix/Solaris/troubleshoot/diskio.html, 2003.
Disk Scheduling, http://dcs.ed.ac.uk/home/stg/pub/D/disk.html.
UNIX man pages : disksort (9F), http://bama.ua.edu/cgi-bin/man-cgi?disksort+9F, 1995.
Apple Computer, Inc., I/O Kit Fundamentals: Drivers and Families, http://developer.apple.com/documentation/DeviceDrivers, 2006.
Zoltan Meggyesi, Fibre Channel Overview, Research Institute for Particle and Nuclear Physics, http://hsi.web.cern.ch/HSI/fcs/spec/overview.htm.
University of New Hampshire InterOperability Laboratory, UNH-IOL Fibre Channel Tutorial, http://www.iol.unh.edu/services/testing/fc/training/tutorials/fc_tutorial.php.
Tom Keiser, Fibre Channel Or, why iSCSI is a Bad Idea.
Wikipedia, High-performance computing, http://en.wikipedia.org/wiki/High_performance_computing, 2006.
Wikipedia, Host adapter, http://en.wikipedia.org/wiki/Host_adapter, 2006.
Christopher Poelker, How SCSI works, http://searchstorage.techtarget.com/ateQuestionNResponse/0,289625,sid5_cid405220)tax286192,00.html, 2001.
HP Storage Works XP Arrays, http://www.hp.com/cgi-bin/pf-new.cgi?in=referer.
Wikipedia, Input/output, http://en.wikipedia.org/wiki/Input/output, 2006.
Intel Storage Solution Implementation Guide, http://www.intel.com/netcomms/technologies/storage/matrix.htm.
ISCSI Review, http://www.digit-life.com/articles2/iscsi/.
Stuart Cheshire, It's the Latency, Stupid, http://www.stuartcheshire.org/rants/Latency.html, 1996.
Monica Pawlan, Application Clients, J2EE Application Client, http://java.sun.com, 2001.
Wikipedia, Lag, http://en.wikipedia.org/wiki/Lag, 2006.
Wikipedia, Latency (engineering), http://en.wikipedia.org/wiki/Latency)%28engineering%29, 2006.
Stuart Cheshire, Latency and the Quest for Interactivity, http://www.stuartcheshire.org/papers/LatencyQuest.html, 1996.
Rob T. Aulwes, et al., Network Fault Tolerance in LA-MPI, http://www.acl.lanl.gov/la-mpi/.
What is LUN?—A Word Definition From the Webopedia Computer Dictionary, http://www.webopedia.com/TERM/L/LUN.html.
Wikipedia, Memory latency, http://en.wikipedia.org/wiki/Memory_latency, 2006.
Wikipedia, Memory locality, http://en.wikipedia.org/wiki/Spatial_locality, 2006.
Wikipedia, Northbridge (computing), http://en.wikipedia.org/wiki/Northbridge_%28computing%29, 2006.
Wikipedia, Opcode, http://en.wikipedia.org/wiki/Opcode, 2006.
Wikipedia, Peripheral Component Interconnect, http://en.wikipedia.org/wiki/Pci, 2006.
Bruce L. Worthington, et al., Scheduling Algorithms for Modern Disk Drives, Proceedings of the ACM Sigmetrics Conference, May 1994, pp. 241-251.
Wikipedia, SCSI, http://en.wikipedia.org/wiki/Scsi, 2006.
SCSI Addressing, The Linux 2.4 SCSI subsystem HOWTO, http://www.linusdocs.org/HOWTOs/SCSI-2.4-HOWTO/scsiaddr.html.
Michael Lamp!, MDL Corporation: SCSI and the Art of I/O Specmanship, http://www.mdlcorp.com/scsi_article.html, 1999.
dpANS, Information technology—SCSI Architecture Model—3 (SAM-3), ISO/IEC 14776-413-200x, ANSI INCITS, Sep. 2004.
Working Draft American National Standard, Information technology—SCSI Architecture Model—4, ISO/IEC 14776-***-200x, ANSI INCITS, Mar. 2005.
SCSI/CAM Utility Program, http://h30097.www3.hp.com/docs/base_doc/DOCUMENTATION/HTML/AA-PS2RE-TE_html.
Wikipedia, SCSI CDB, http://en.wikipedia.org/wiki/SCSI_CDB, 2006.
SCSI Extensions for Network Attached Storage, Seagate, Apr. 30, 1998.
Wikipedia, SCSI host adapter, http://en.wikipedia.org/wiki/SCSI_host_adapter, 2006.
Wikipedia, SCSI Inquiry Command, http://en.wikipedia.org/wiki/SCSI_Inquiry_Command, 2006.
SCSI Utility for Windows, Moojit.Net, http://www.moohit.net/Networking/scsiwin.shtml, 2006.
Kevin Butt, SPC-4: Self Describing Command Timeouts, Jul. 22, 2005.
Yoichi Shinoda, MPLS: A Packet forwarding technology for the next generation Internet, Japan Advanced Institute of Science and Technology.
Special planning considerations for auxiliary write cache I/O adapters, http://publib.boulder.ibm.com/infocenter/eserver/v1r3s/topic/iphae_web/planioauxwritecache.htm.
David Robinson, Re: Status summary on multiple connections, IP Storage Mailing List Archive, http://www.pdl.cmu.edu/mailinglists/ips/mail/msg01347.html, Sep. 28, 2000.
Wikipedia, Storage area network, http://en.wikipedia.org/wiki/Storage_area_network, 2006.
Dimitar Todorov, et al., Storage Networks on IP infrastructure, International Workshop NGNT, pp. 50-56.
Storage, C0MP3300, The Australian National University, http://cs.anu.edu.au/Student/comp3300/lectures/disk.pdf, pp. 1-17.
John Webster, Interoperability The Storage Networking Challenge, White Paper, Computerworld Custom Publishing, Aug. 28, 2000.
Should you fit their storage or should our storage fit you?, Storageflex, www.Storageflex.com.
An Optimal Approach: Emulex Corporation's Implementation of a Windows Server 2003 Storport Miniport Driver, Emulex, www.emulex.com.
Understanding Device Special File Names, Hewlett-Packard Development Company, L.P., http://docs.hp.com/cgi-bin/pf-new.cgi?IN=/en/B2355-90675/ch01s04.html&printable=1, 2006.
Upper Layer Module (ULM) Services (Deprecated), Hewlett-Packard Development Company, L.P., http://docs.hp.com/cgi-bin/pf-new.cgi?IN=/en/5991-1101/ch05s22.html&printable=1, 2006.
Elizabeth Dicke, et al., Using a Genetic Algorithm to Design Improved Storage Area Network Architectures, Hewlett-Packard Company, Nov. 4, 2003.
Virtual SCSI sizing considerations, http://publib.boulder.ibm.com/infocenter/eserver/v1r3s/topic/iphb1/iphb1_vios_planning_vscsi_sizing.
Girish P. Chandranmenon, et al., Reducing Web Latency Using Reference Point Caching, Proceedings of IEEE Infocom, pp. 1607-1616, 2001.
Kulvir Bhogal, WebSphere Application Server Pluggable Application Client, IBM, http://www-128.ibm.com/developerworks/websphere/library/techarticles/0409_bhogal/0409_bhogal.html, Sep. 1, 2004.

* cited by examiner

SCSI I/O COORDINATOR

BACKGROUND

The term SCSI (Small Computer System Interface) may refer to a SCSI-3 set of standards and technologies. SCSI-3 is a suite of standards that define command sets, protocols, and signaling methods such as Fibre Channel, SCSI Parallel Interface (SPI), Serial Attached SCSI, etc. SCSI is not limited to the SCSI Parallel Interface (SPI).

A SCSI I/O comprises a SCSI Command request sent to the SCSI I/O controller along with a SCSI I/O context that is used to associate a response from the SCSI I/O controller with the original SCSI I/O.

With respect to host side queuing with an example of a SCSI HBA (host bus adapter), SCSI I/O contexts are typically stored on the SCSI I/O controller. The host side transport driver typically deals with space for 256 I/O contexts on SCSI I/O controllers and uses a credit based model with the I/O controller in managing the I/O contexts. Whenever the driver runs out of credits on the SCSI I/O controller, the driver queues I/Os (I/O requests and/or commands) in the host memory until some pending I/O requests complete, thus freeing up I/O contexts.

DESCRIPTION OF THE DRAWINGS

Features of exemplary implementations of the invention will become apparent from the description, the claims, and the accompanying drawings in which:

DETAILED DESCRIPTION

Referring to the BACKGROUND section above, when in an example the host side transport driver runs out of credits on the SCSI (Small Computer System Interface) I/O (input/output) controller, the host side transport driver queues I/Os (I/O requests and/or commands) in the host memory until some pending I/O requests complete to free up I/O contexts.

The SCSI I/O controller stores the SCSI I/O contexts. If there is no space remaining on the SCSI I/O controller, the Host/server will hold off and refrain from sending more I/O requests to the SCSI I/O controller. A SCSI I/O controller, with its limited resources, cannot guarantee QoS (Quality of Service) for the I/Os that go through the SCSI I/O context when its cache is filled. When SCSI I/O context table becomes full on the controller, the controller does not process any further I/O requests.

It may be undesirable to reduce the overall throughput based on a limitation of the amount of memory for storing SCSI I/O contexts available on the SCSI I/O controller. It may be undesirable for slow or high-latency devices such as a Tape Drive to prevent posting of I/O requests to other potentially faster devices such as disks in the topology. It may be undesirable for high-latency SCSI commands such as FORMAT UNIT and SEND DIAGNOSTIC to prevent posting of other potentially low-latency requests such as INQUIRY and TUR (Test Unit Ready). It may be undesirable to have inefficient utilization of transport bandwidth that reduces the overall throughput. It may be undesirable when the SCSI I/O controller runs out of context table entries, for the SCSI I/O controller to be unable to admit any further requests including high-priority requests. It may be undesirable to queue up high priority requests behind normal requests.

Existing SCSI I/O controllers have inherent limitations on scaling to large SAN (storage area network) configurations. These limitations result in underutilization of SCSI transport and device bandwidth. In data intensive applications and HPC (high performance computing) configurations, SCSI I/O patterns exhibit spatial locality. An exemplary approach identifies spatial locality in SCSI I/Os and employs spatial locality for SCSI I/O context Caching. An exemplary implementation reduces and/or eliminates existing limitations on the SCSI I/O controllers.

With respect to SAN (storage area network) scalability, mismatches in the resources on SCSI I/O controllers and the cumulative resources of SCSI devices in the SAN may result in underutilization of the SAN bandwidth as well as SCSI Device bandwidth. With respect to application access of storage in enterprise data centers, data intensive applications may access data in a serial pattern. Moreover, certain storage devices such as tapes may mandate that the data be accessed sequentially. Ordering I/Os that match the storage access pattern and tuning and/or optimizing the data access performance for serial access may enhance and/or improve the overall system performance. With respect to disksort (e.g., single direction elevator seek sort for buffers) on I/Os, on random access storage devices like disks, an approach that serializes the I/Os to reduce the seek time may be enhanced by having the coordinator of these I/Os at the host side aware and/or cognizant of the I/O behavior, for example, to leverage the sequential nature of SCSI I/Os.

With respect to QoS (Quality of Service) controls, a SCSI I/O in an example is processed through various layers, such as ULMs (Upper Layer Modules), peripheral device driver, transport driver, and SCSI I/O controller on the host, and through various elements in the fabric such as switches and storage devices. Enforcing a certain QoS for a SCSI I/O is enhanced by coordination across various levels and components in the I/O path. A SCSI I/O controller with typically limited resources in an example cannot guarantee QoS for the I/Os that go through the SCSI I/O controller. When the SCSI I/O context table becomes full on the SCSI I/O controller, the SCSI I/O controller in an example cannot process any further I/O requests, including high-priority requests. In this case, the host driver flow controls the I/O requests to the SCSI I/O controller which may result in queuing high priority I/Os behind lower-priority ones already pending with SCSI devices.

With respect to SCSI SAM-3 Task Priority, SCSI Architectural Model (SAM-3 onwards) defines a SCSI task priority in the CDB (Command Descriptor Block). Assuming that the I/O originator fills in the priority field in the CDB based on policies specific to the host, without enhancement and/or improvement to the current host driver model, the I/O request could still get stuck behind lower priority outstanding I/Os at the SCSI I/O controller when the SCSI I/O context cache becomes full. In view of challenges from heterogeneous I/O traffic and lack of QoS controls, the host driver without enhancement and/or improvement in an example cannot enforce the task priority on the host side.

It may be unsatisfactory to increase the I/O context resources on the SCSI I/O controller hardware. It may be undesirable to incur an increased cost associated with increasing the I/O context resources. It may be undesirable to undertake field replacement of existing I/O cards.

Figure 1:
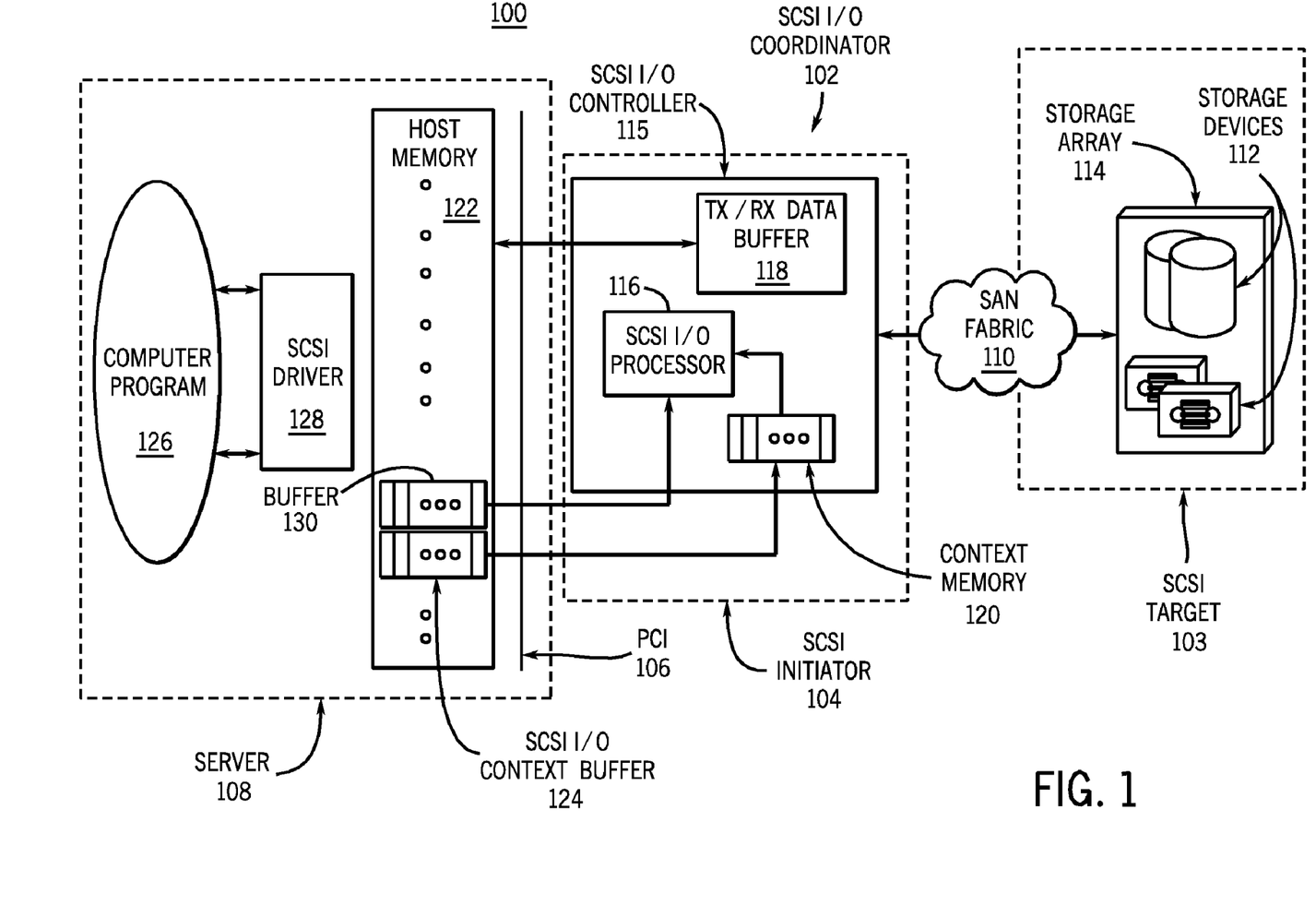
FIG. 1 is a representation of an implementation of an apparatus according to a preferred embodiment of the invention that comprises one or more SCSI (Small Computer System Interface) I/O (input/output) coordinators, one or more SCSI initiators, one or more buses, one or more hosts and/or servers, one or more storage fabrics, and/or one or more SCSI targets, with an exemplary SCSI I/O coordinator locatable in a variety of parts of the apparatus.

Turning to FIG. 1, an implementation of an apparatus 100 in an example comprises a coordinator, an initiator, a plurality of memories, and one or more targets. The apparatus 100 in an example comprises a network, system, and/or fabric, for example, a storage network, storage system, and/or storage fabric. The coordinator in an example employs the memory to access the target, for example, storage. An exemplary coordinator comprises a Small Computer System Interface (SCSI) input/output (I/O) coordinator 102, for example, an exemplary implementation of an algorithm, procedure, program, mechanism, engine, model, coordinator, module, application, code, and/or logic. An exemplary initiator comprises an application client and/or SCSI initiator 104. An exemplary target comprises a SCSI target 103. The apparatus 100 in an example comprises one or more SCSI I/O coordinators 102, one or more SCSI initiators 104, one or more buses such as exemplary PCI (Peripheral Component Interconnect) 106, one or more hosts and/or servers 108, one or more storage fabrics such as exemplary Storage Area Network (SAN) fabric 110, and/or one or more SCSI targets 103 that comprise storage devices 112 and/or storage arrays 114. An exemplary SCSI initiator 104 comprises one or more SCSI I/O controllers 115.

The SCSI I/O coordinator 102 in an example may be located in a variety of parts of the apparatus 100. The SCSI initiator 104 and/or SCSI I/O controller 115 in an example comprise the SCSI I/O coordinator 102. The server 108 in an example comprises the SCSI I/O coordinator 102. The SAN fabric 110 in an example comprises the SCSI I/O coordinator 102, for example, on a switch of the SAN fabric 110. The storage array 114 in an example comprises the SCSI I/O coordinator 102. The SCSI I/O coordinator 102 in an example may be implemented anywhere between host memory 122 on the server 108 and the SCSI I/O controller 115. The SCSI I/O coordinator 102 in an example may be implemented as a PCI (Peripheral Component Interconnect) function accessible to a northbridge or Memory Controller Hub (MCH) that access the SCSI I/O controller 115. An illustrative description of an exemplary implementation of the SCSI I/O coordinator 102 located on the SCSI I/O controller 115 is presented herein, for explanatory purposes.

An exemplary approach defines spatial locality in SCSI I/Os. An exemplary SCSI I/O coordinator 102 identifies spatial locality in SCSI I/Os, which spatial locality identification is not performed by a standard SCSI I/O controller. The identified and/or obtained knowledge of spatial locality may be employed in various ways and/or scenarios. An exemplary implementation of the SCSI I/O coordinator 102 employs SCSI I/O context caching in the SCSI I/O controllers 115. By caching SCSI I/O contexts in the memory (e.g., context memory and/or SCSI I/O controller cache and/or memory 120) available on the SCSI I/O controller 115, and by using the host memory 122 to store additional SCSI I/O contexts, an exemplary implementation of a SCSI I/O coordinator 102 increases the quantity of outstanding I/O contexts that an SCSI I/O coordinator 102 may handle. With the increase in I/O context resources, an exemplary SCSI I/O coordinator 102 may increase performance, for example, substantially without increasing the cost of the system and/or apparatus. An exemplary implementation may be provided in firmware and/or software, for example, as amenable to existing and/or standard SCSI I/O controllers.

The SCSI I/O coordinator 102 in an example performs one or more SCSI functions such as discovery of SCSI targets 103, communication with the SCSI targets 103 and/or SAN fabric 110 using protocol specific sequence of operations, SCSI I/O request and response processing, and/or SCSI target management functions. The SCSI I/O coordinator 102 in an example works in conjunction with other exemplary components such as the context memory and/or SCSI I/O controller cache and/or memory 120 as a SCSI I/O context memory, the host memory 122, transmit/receive (Tx/Rx) data buffer 118, computer program 126, and SCSI driver 128. The SCSI I/O coordinator 102 in an example may access the host memory 122 using the PCI protocols of the PCI 106. The SCSI I/O coordinator 102 in an example employs the host memory 122 to access a target 103, for example, through additional employment of the SCSI I/O controller memory 120. The SCSI I/O coordinator 102 in an example caches in memory local, internal to, and/or on-chip with the SCSI I/O coordinator 102 such as the SCSI I/O controller memory 120, one or more I/O request contexts stored in memory non-local to the SCSI I/O coordinator 102 such as SCSI I/O context buffer 124 of the host memory 122, for example, as a backing store.

An exemplary server 108 comprises memory such as the host memory 122, SCSI application and/or computer program 126, and the SCSI driver 128. The host memory 122 in an example comprises the SCSI I/O context buffer 124 and a buffer 130, for example, that may comprise standard computer memory. The SCSI I/O context buffer 124 in an example comprises a specific amount of memory allocated from the host memory 122 for use by the SCSI I/O coordinator 102 to store SCSI I/O contexts. The SCSI I/O context buffer 124 in an example is managed by SCSI I/O coordinator 102. The SCSI I/O context buffer 124 in an example is non-local to the SCSI I/O coordinator 102. In an exemplary implementation where the SCSI I/O coordinator 102 is located in part of the apparatus 100 other than the server 108 and/or the SCSI I/O initiator 104, the SCSI I/O context buffer 124 may be located in the part of apparatus 100 where the SCSI I/O coordinator 102 is located, for example, and still non-local to the SCSI I/O coordinator 102. For example, if the SCSI I/O coordinator 102 is located in the storage array 114, the SCSI I/O context buffer 124 may also be located in the storage array 114. An exemplary computer program 126 comprises an exemplary implementation of an algorithm, procedure, program, mechanism, engine, model, coordinator, module, application, code, and/or logic. An exemplary computer program 126 may be implemented as kernel-resident and/or operating-system-resident logic and/or may comprise user-level programs, for example, user interface logic residing in user-level program files with additional and/or remaining logic residing in the kernel and/or underlying operating system. The computer program 126 in an example comprises one or more data intensive computer programs.

The storage array 114 in an example comprises one or more of the storage devices 112. In another example, the storage devices 112 comprise standalone storage devices separate from the storage array 114. The storage devices 112 in an example comprise random access and/or sequential access storage devices, for example, disks, tape drives, and/or high latency storage. The storage devices 112 and/or the storage array 114 in an example comprise a target 103 of the SCSI I/O coordinator 102. The storage array 114 in an example comprises a SCSI Device Server and/or LUN (logical unit number). For example, the storage device 112 comprises a SCSI device (LUN).

The SCSI initiator 104 in an example begins a SCSI transaction by issuing a command to the SCSI target 103 using the applicable SCSI transport protocol such as Fibre Channel, Serial Attached SCSI, and/or the like. The SCSI target 103 in an example comprises a storage array 114 that comprises the storage devices 112. In another example, the SCSI target 103 comprises standalone storage devices 112. The SCSI initiator 104 in an example comprises a first cause and/or initiator of an I/O request. The I/O request in an example proceeds to the SCSI I/O coordinator 102. The SCSI I/O coordinator 102 in an example uses a SCSI transport protocol to issue a SCSI transaction to the SCSI target 103.

An exemplary SCSI I/O controller 115 comprises a SCSI I/O processor 116, a transmit/receive (Tx/Rx) data buffer 118, and a SCSI I/O controller cache and/or memory 120. An exemplary PCI 106 comprises one or more of PCI and/or variants of PCI, for example, PCI-X and/or PCI Express (PCIe).

Figure 2:
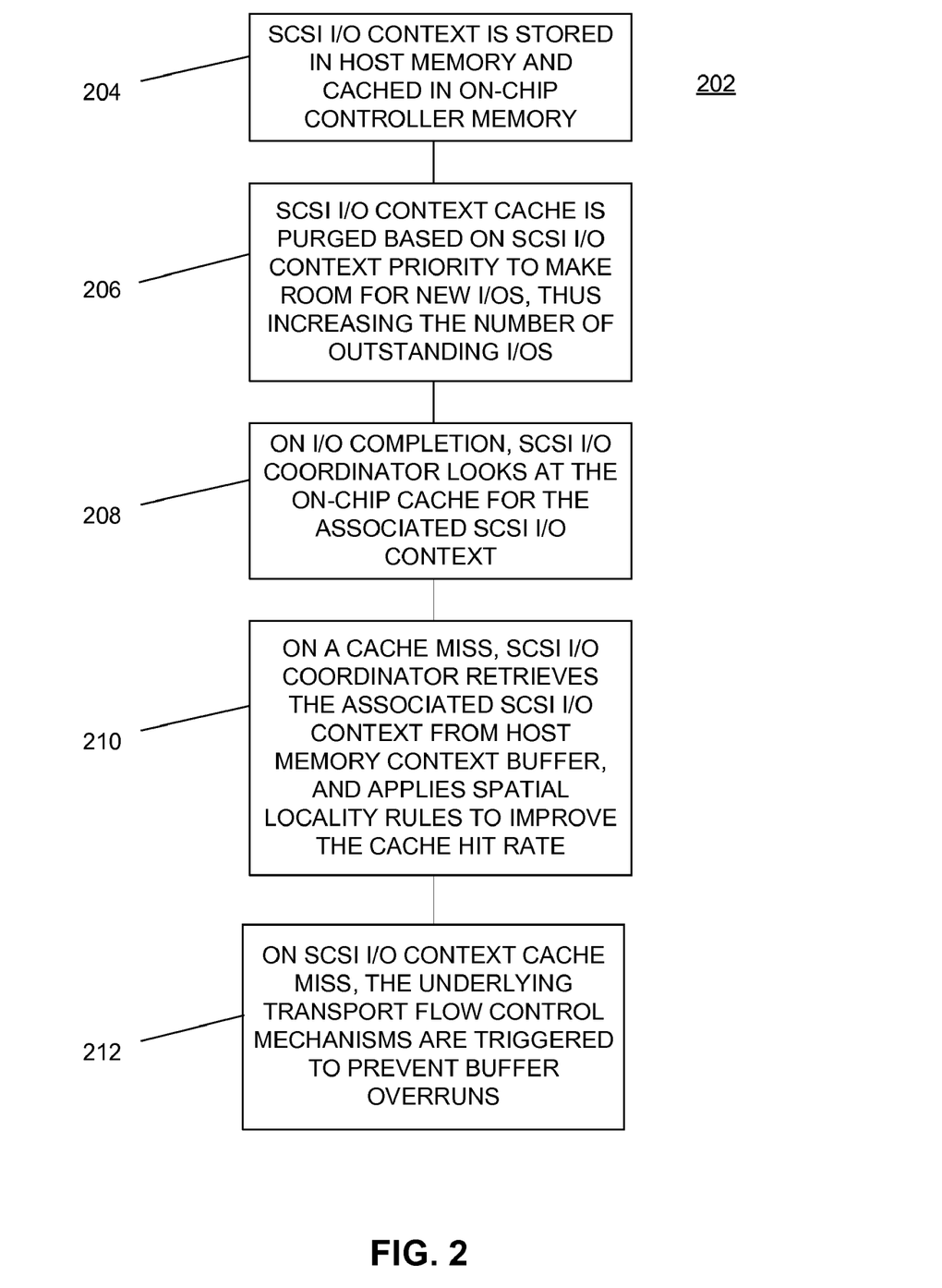
FIG. 2 is a representation of an exemplary logic flow for an exemplary employment of exemplary spatial locality by an exemplary SCSI I/O coordinator of an implementation of the apparatus of FIG. 1.

An illustrative description of an exemplary operation of an implementation of the apparatus 100 with the SCSI I/O coordinator 102 located on the SCSI I/O controller 115 is presented, for explanatory purposes. Turning to FIG. 2, in an exemplary logic flow 202 at STEP 204, the SCSI I/O coordinator 102 in an example stores SCSI I/O context in the host memory 122 and caches the SCSI I/O context in on-chip memory such as the SCSI I/O controller memory 120. The SCSI I/O coordinator 102 at STEP 206 in an example purges SCSI I/O context from the SCSI I/O controller memory 120 based on SCSI I/O context priority to make room for new and/or additional I/Os, for example, increasing the number of outstanding and/or pending I/Os. The SCSI I/O coordinator 102 in an example purges from on-chip memory such as the SCSI I/O controller memory 120 one or more I/O request contexts stored in the host memory 122 to make room in the on-chip memory such as the SCSI I/O controller memory 120 for one or more additional I/O request contexts more-recently stored in the host memory 122.

The SCSI I/O coordinator 102 at STEP 208 in an example on I/O completion looks at the SCSI I/O controller memory 120 for the associated SCSI I/O context. At STEP 208, if the SCSI I/O controller memory 120 contains the required SCSI I/O context, the SCSI I/O coordinator 102 completes the SCSI I/O by passing on the SCSI response to the host and/or server 108 using the associated SCSI I/O context. Then, the SCSI I/O context is freed from the SCSI I/O controller memory 120 and the SCSI I/O context buffer 124. The SCSI I/O coordinator 102 at STEP 210 in an example on a cache miss retrieves the associated SCSI I/O context from the SCSI I/O context buffer 124. Upon a cache miss for one or more I/O request contexts in the on-chip memory such as the SCSI I/O controller memory 120, the SCSI I/O coordinator 102 in an example retrieves the one or more I/O request contexts from the SCSI I/O context buffer 124. The SCSI I/O coordinator 102 in an example applies spatial locality rules to improve the cache hit rate. The SCSI I/O coordinator 102 in an example applies spatial locality rules to improve cache hit rate in on-chip memory such as the SCSI I/O controller memory 120 for of one or more I/O request contexts stored in the SCSI I/O context buffer 124. The SCSI I/O coordinator 102 at STEP 212 in an example on SCSI I/O context cache miss triggers exemplary underlying transport flow control mechanisms such as Fibre Channel Buffer-to-Buffer flow control, for example, to prevent buffer overruns.

The SCSI I/O coordinator 102 in an example identifies a SCSI I/O (SCSI I/O request and/or SCSI command) with an initiator/target/logical unit/queue (ITLQ) nexus. An exemplary ITLQ nexus as defined in the SCSI standards uniquely identifies any SCSI I/O request by including the Initiator Port Identifier, Target Port Identifier, Logical Unit Number (LUN), and the Queue Tag.

An exemplary Command Descriptor Block (CDB) for a SCSI I/O request comprises a block address for the data, device type, and SCSI command attributes. I/Os targeted to a same storage device 112 and/or storage array 114 in an example may show substantially same completion rates. The storage device 112 and/or storage array 114 in an example may reorder the I/Os, for example, to improve the seek time for an I/O. An exemplary SCSI I/O coordinator 102 ties such behavior of the storage device 112 and/or storage array 114 with a typical behavior of an application issuing I/Os targeting the same storage device 112 and/or storage array 114 in a sequential pattern, to obtain an inherent and/or implicit locality of reference in a group of I/Os initiated at an exemplary host and/or server 108. The SCSI I/O coordinator 102 in an example identifies an implicit pattern in SCSI I/O access for locality of reference, for example, to improve performance of the SAN fabric 110, the computer program 126 running on the server 108, and/or the apparatus 100 as a whole.

An exemplary SCSI I/O coordinator 102 caches SCSI I/O contexts rather than storing the SCSI I/O contexts on-chip. With respect to SCSI I/O contexts, the SCSI I/O coordinator 102 in an example manages the SCSI I/O controller memory 120 as a cache by leveraging spatial locality in SCSI I/Os. The SCSI I/O coordinator 102 in an example obviates and/or alleviates thrashing of cache contents and/or access delays in the case of cache miss. The SCSI I/O coordinator 102 in an example pre-fetches and purges SCSI I/O contexts into and from the SCSI I/O controller memory 120 as the cache through employment of the SCSI I/O context buffer 124. The SCSI I/O coordinator 102 in an example reduces and/or eliminates I/O context bottleneck at the SCSI I/O coordinator 102, for example, allowing the host 108 to provide more deterministic QoS (quality of service) Service Level Agreements on SCSI I/Os.

Figure 3:
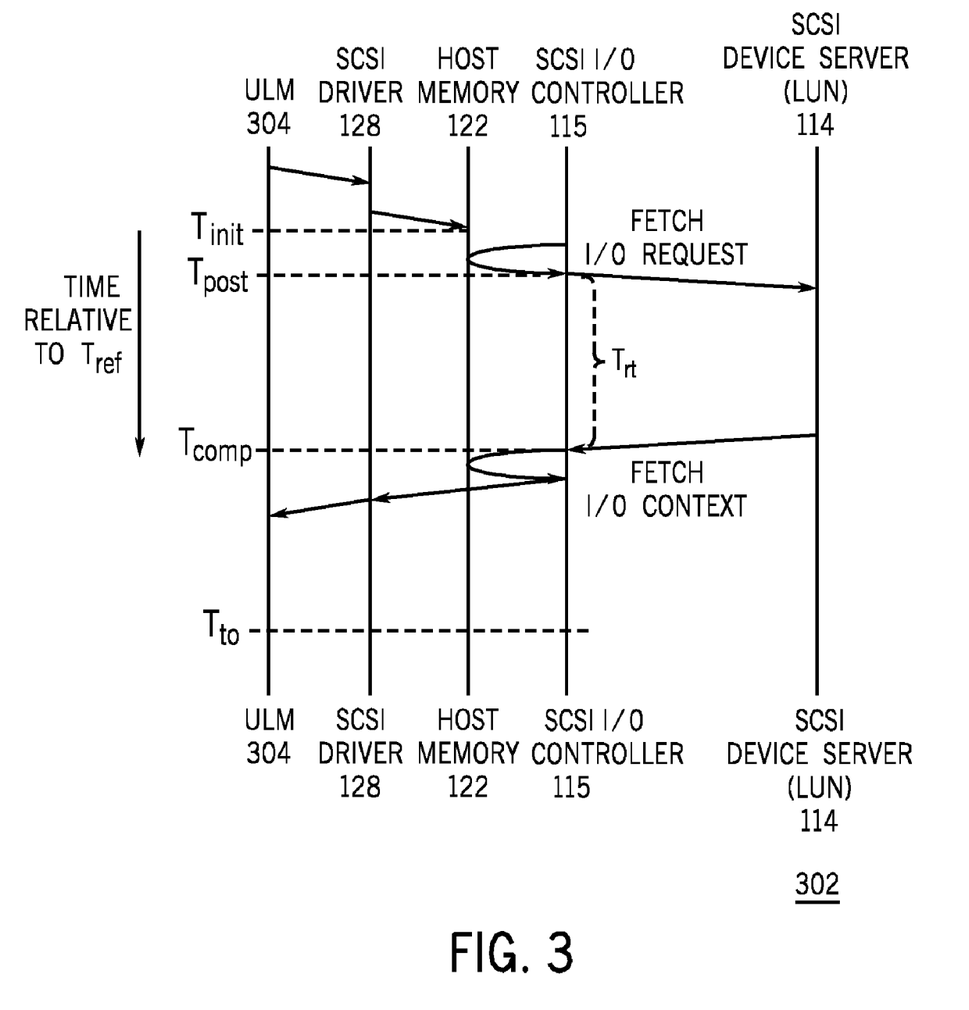
FIG. 3 is a representation of an exemplary time flow of a SCSI I/O request in an implementation of the apparatus of FIG. 1.

FIG. 3 presents an exemplary time flow 302 of a SCSI I/O request. A SCSI I/O in an example is processed through various layers, such as a ULM (Upper Layer Module) 304, the SCSI driver 128, the host memory 122, the SCSI I/O controller 115, and the SCSI Device Server as the storage array 114. Reference Timer Tref in an example comprises a reference timer that is common across the server 108 and the SCSI I/O controller 115. All other timers in an example are relative to Tref. For example, timers Tcur, Tinit, Tpost, Tcomp, Tto are relative to Tref. Current time Tcur in an example comprises the current time with respect to Tref. SCSI I/O request initialization timestamp Tinit in an example comprises the time at which the SCSI I/O request is set up, so the I/O request is ready to be posted to the SCSI Device Server (LUN) as the storage array 114. I/O request post timestamp Tpost in an example comprises the time at which the SCSI I/O is posted to the SCSI Device Server (LUN) as the storage array 114 for I/O processing. In an example, there may be a small time delta between the time at which the SCSI I/O controller 115 pulls the I/O request from the host memory 122 and posts the I/O request to the SCSI Device Server (LUN) as the storage array 114. This relatively small time interval in an example is considered not significant and is ignored by an exemplary SCSI spatial locality identification approach and/or implementation of the SCSI I/O coordinator 102.

Estimated round-trip latency Trt in an example comprises the estimated amount of time from the point at which the SCSI I/O request is posted to the SCSI Device Server (LUN) as the storage array 114 to the point at which the SCSI I/O coordinator 102 receives the completion. Trt timer in an example comprises an estimate per initiator/target/logical unit/queue (ITLQ) nexus. The SCSI driver 128 in an example estimates the round-trip time and/or latency for the SCSI command. Estimated time at completion Tcomp in an example comprises the estimated time at which the SCSI I/O request already posted to the SCSI Device Server (LUN) as the storage array 114 is expected to complete. Tcomp is calculated as (Tpost+Trt). SCSI I/O timeout value Tto in an example is assigned by the SCSI driver 128 and/or an SCSI application as the computer program 126. This timer Tto in an example specifies the amount of time that an outstanding I/O, for example, an I/O that is setup in the host memory 122, will be given for completion before the I/O is timed out by the SCSI driver 128.

Spatial locality in SCSI I/Os may be employed by the SCSI I/O coordinator 102. The SCSI I/O coordinator 102 in an example identifies spatial locality in SCSI I/Os through employment of one or more attributes such as the following, not listed exclusively: SCSI command type, SCSI device type, SCSI task attribute, and SCSI transport factors. One or more additional and/or substitute attributes may be employed, as will be appreciated by those skilled in the art. The SCSI I/O coordinator 102 in an example identifies spatial locality within a given ITLQ nexus as well as across different ITLQ nexuses.

Heterogeneous I/O traffic in an example may be identified and/or handled by the SCSI I/O coordinator 102. An exemplary SCSI I/O coordinator 102 organizes and/or assembles SCSI I/Os into categories in connection with latencies, for example, latencies of storage devices 112 and I/O commands. The device latency in an example relates to the devices 112 and/or the storage array 114. Exemplary device latency comprises the time spent by a device server as the storage array 114 in completing a SCSI I/O. This may depend on the characteristics of a device server. Serial devices typically have high latencies compared to random access devices such as disks. Exemplary command latency comprises the approximate time a device server as the storage array 114 takes to complete an I/O request. Certain commands such as formatting a disk drive are inherently slow and thus take greater amounts of time compared to I/O commands such as SCSI read or SCSI write. Exemplary categories, sets, and/or groups for the storage devices 112 may be based on device latency and command latency.

Exemplary category #1 comprises storage devices 112 that comprise high device latency and high command latency. Exemplary category #2 comprises storage devices 112 that comprise high device latency and low command latency. Exemplary category #3 comprises storage devices 112 that comprise low device latency and high command latency. Exemplary category #4 comprises storage devices 112 that comprise low device latency and low command latency. On an exemplary SAN fabric 110 where heterogeneous storage devices 112 may be widely prevalent, traffic in an example may be interleaved with I/Os from a plural number and/or all of the exemplary categories #1, #2, #3, and/or #4. Exemplary prioritizing, organizing, and/or grouping among the exemplary categories #1, #2, #3, and/or #4 in an example positively affects performance, for example, of potentially faster I/Os belonging to exemplary category #4.

The SCSI I/O coordinator 102 in an example comprises a spatial locality algorithm, procedure, program, mechanism, engine, model, coordinator, module, application, code, and/or logic. Exemplary inputs to the SCSI I/O coordinator 102 comprise SCSI I/Os and spatial locality criteria. The SCSI I/Os in an example comprise different characteristics such as command type, targeted SCSI device type, SCSI task attributes, device latencies, and command latencies. The SCSI I/O coordinator 102 in an example identifies spatial locality among the input SCSI I/Os subject to exemplary spatial locality criteria. The SCSI I/O coordinator 102 in an example employs the spatial locality to group the I/Os into different categories, for example, exemplary categories #1, #2, #3, and/or #4. The spatial locality criteria in an example cause the SCSI I/O coordinator 102 to reorder the SCSI I/Os.

Spatial locality in SCSI I/Os in an example may be leveraged in various forms in SCSI implementations. An exemplary implementation employs SCSI I/O context caching, for example, to increase the number and/or maximum number of concurrent I/Os at the SCSI controller 115. Exemplary SCSI I/O spatial locality attributes may be employed by the SCSI I/O coordinator 102 to determine the spatial locality in SCSI I/Os. An exemplary SCSI Task Attribute may be employed by the SCSI I/O coordinator 102. Each SCSI I/O in an example comprises a Task Attribute assigned by the SCSI I/O coordinator 102. On a given ITLQ nexus in an example the SCSI I/O coordinator 102 employs task attributes, for example, defined in a SCSI Architectural Model (SAM) specification.

An exemplary Simple Task attribute specifies that the SCSI I/O request be executed in any order deemed desirable by the SCSI target 103. With respect to an exemplary Simple Task attribute, a SCSI device server as the storage array 114 in an example that lacks input, assistance, coordination, guidance, and/or employment of the SCSI I/O coordinator 102 does not perform special processing for SCSI commands with the Simple Task attribute, leaving an opportunity to sort the I/Os for enhancement and/or improvement of system-wide performance. The SCSI I/O coordinator 102 in an example leverages this opportunity and/or flexibility to reorder commands with the Simple Task attribute, for example, to enhance and/or improve the spatial locality.

An exemplary Ordered Task attribute specifies the order of processing SCSI I/O requests by the SCSI target 103 as follows:

The SCSI target 103 shall execute the SCSI I/O requests in the order received with respect to other requests received with Ordered Task attribute.

All SCSI I/O requests received with Simple Task Attribute prior to a SCSI I/O request received with Ordered Task attribute shall be executed before that request with the Ordered Task attribute.

All SCSI I/O requests received with Simple Task attribute after a SCSI I/O request received with Ordered Task attribute, shall be executed after that SCSI I/O request with the Ordered Task attribute.

With respect to an exemplary Ordered Task attribute on an exemplary ITLQ nexus, a SCSI device server as the storage array 114 in an example that lacks input, assistance, coordination, guidance, and/or employment of the SCSI I/O coordinator 102 processes all commands with Ordered Task attribute set, in the order they are received. The SCSI I/O coordinator 102 in an example classifies I/Os with Ordered Task attribute set as having spatial locality.

An exemplary Head of Queue Task attribute specifies the order of processing SCSI I/O requests by the SCSI target 103 as follows:

A SCSI I/O request received with Head of Queue Task attribute shall be executed prior to any queued SCSI I/O requests.

Consecutive SCSI I/O requests received with Head of Queue Task attribute are executed in a last-in-first-out order.

With respect to an exemplary Head of Queue Task attribute on an exemplary ITLQ nexus, a SCSI device server as the storage array 114 in an example that lacks input, assistance, coordination, guidance, and/or employment of the SCSI I/O coordinator 102 processes all commands with Head of Queue attribute set, before processing any other pending I/Os. The SCSI I/O coordinator 102 in an example classifies I/Os with Head of Queue attribute set as having spatial locality. The SCSI I/O coordinator 102 in an example further classifies such I/Os based on the Ordered Task attribute.

An exemplary linked command connects and/or glues together multiple commands in an I/O process. Linked commands in an example may useful because the data obtained from one command may be used by another command to perform a routine. With respect to exemplary SCSI Linked Commands, a SCSI device server as the storage array 114 in an example that lacks input, assistance, coordination, guidance, and/or employment of the SCSI I/O coordinator 102 does not process other SCSI tasks until all linked commands in a given ITLQ nexus are processed. On an exemplary ITLQ nexus, the SCSI I/O coordinator 102 in an example classifies I/Os with Link Command attribute set as having spatial locality.

With respect to exemplary SCSI Device Type, SCSI tape devices as the storage devices 112 in an example comprise sequential access devices and data on them may be accessed in sequential order. Given that, the SCSI I/O coordinator 102 in an example does not reorder I/Os targeted to a SCSI tape device as the storage device 112. In a further example, due to an exemplary high latency nature of the tape devices as the storage devices 112, the SCSI I/O coordinator 102 in an example reorders I/Os across different ITLQ nexuses to better suit expected round trip completion times.

Further with respect to exemplary SCSI Device Type, SCSI Disk devices as the storage devices 112 in an example comprise direct access devices and data on them may be accessed in random order and/or comprise a faster round trip. The SCSI I/O coordinator 102 in an example employs the Logical Block Address (LBA) contained in the READ/WRITE SCSI CDB (Command Descriptor Blocks), for example, to determine spatial locality among SCSI I/Os within the ITLQ nexus.

With respect to SCSI I/O Logical Block Address (LBA), exemplary SCSI Disk devices as the storage devices 112 in an example employ scheduling algorithms and/or approaches such as C-SCAN and C-LOOK, for example, to sequentially access the data based on LBA. Given the sequential completions of SCSI I/Os based on the LBA due to the disk scheduling algorithms and/or approaches, on a given disk ITLQ nexus the SCSI I/O coordinator 102 in an example reorders I/Os based on the LBAs to match the I/O request order with that of the completions. Such techniques in an example may be leveraged by an exemplary SCSI I/O coordinator 102 that performs SCSI I/O context caching, for example, to improve the cache hit ratio and/or spatial locality.

With respect to exemplary SCSI I/O Round-Trip Latency (Trt), an exemplary and/or average round-trip latency for a SCSI I/O may depend on several factors such as the following, not listed exclusively. SCSI Device Characteristics may correspond to device type and device I/O latency. SCSI Command Type may involve SCSI Commands that may require medium access that result in higher latency than other commands that require only buffer access on the storage device 112. Exemplary SCSI Data Transfer Size may involve a larger data transfer corresponding to a higher round-trip latency. Exemplary SCSI LUN Path Latency may involve estimates based on round-trip for commands (such as INQUIRY), for example, that may involve minimal and/or low processing by the SCSI device (LUN) as the storage device 112. Exemplary Self Describing Command Timeouts may involve an exemplary SCSI device (LUN) as the storage device 112 that may provide the amount of time required by the LUN to process different types of commands. This information in an example is provided via Command Timeouts information that may be used to estimate the round-trip latency for a SCSI I/O.

Exemplary Spatial Locality Criteria in an example determine factors the SCSI I/O coordinator 102 in an example employs to identify spatial locality among the input SCSI I/Os. Exemplary spatial locality criteria in an example comprise one or more factors such as the following. A specific ITLQ nexus in an example allows the SCSI I/O coordinator 102 to identify spatial locality for a given ITLQ nexus. A set of ITLQ nexuses in an example allows the SCSI I/O coordinator 102 to identify spatial locality on a per-ITLQ nexus for all the given ITLQ nexuses. SCSI Command Opcode (operation code), logic, and/or procedure in an example allows the SCSI I/O coordinator 102 to identify spatial locality among I/Os that contain the given Command Opcode (operational code), logic, and/or procedure. SCSI Device Type in an example allows the SCSI I/O coordinator 102 to identify spatial locality among I/Os that are targeted to the given SCSI Device type. Exemplary SCSI I/O Timer Rules comprise one or more logical expressions of SCSI I/O timers such as Initialization time-stamp, Timeout threshold, Round-trip threshold. The SCSI I/O coordinator 102 in an example employs the SCSI I/O timer rules to identify spatial locality among I/Os. Spatial Locality Interval in an example allows the SCSI I/O coordinator 102 to identify spatial locality for I/Os that are expected to complete within the given interval across different ITLQ nexuses.

Figure 4:
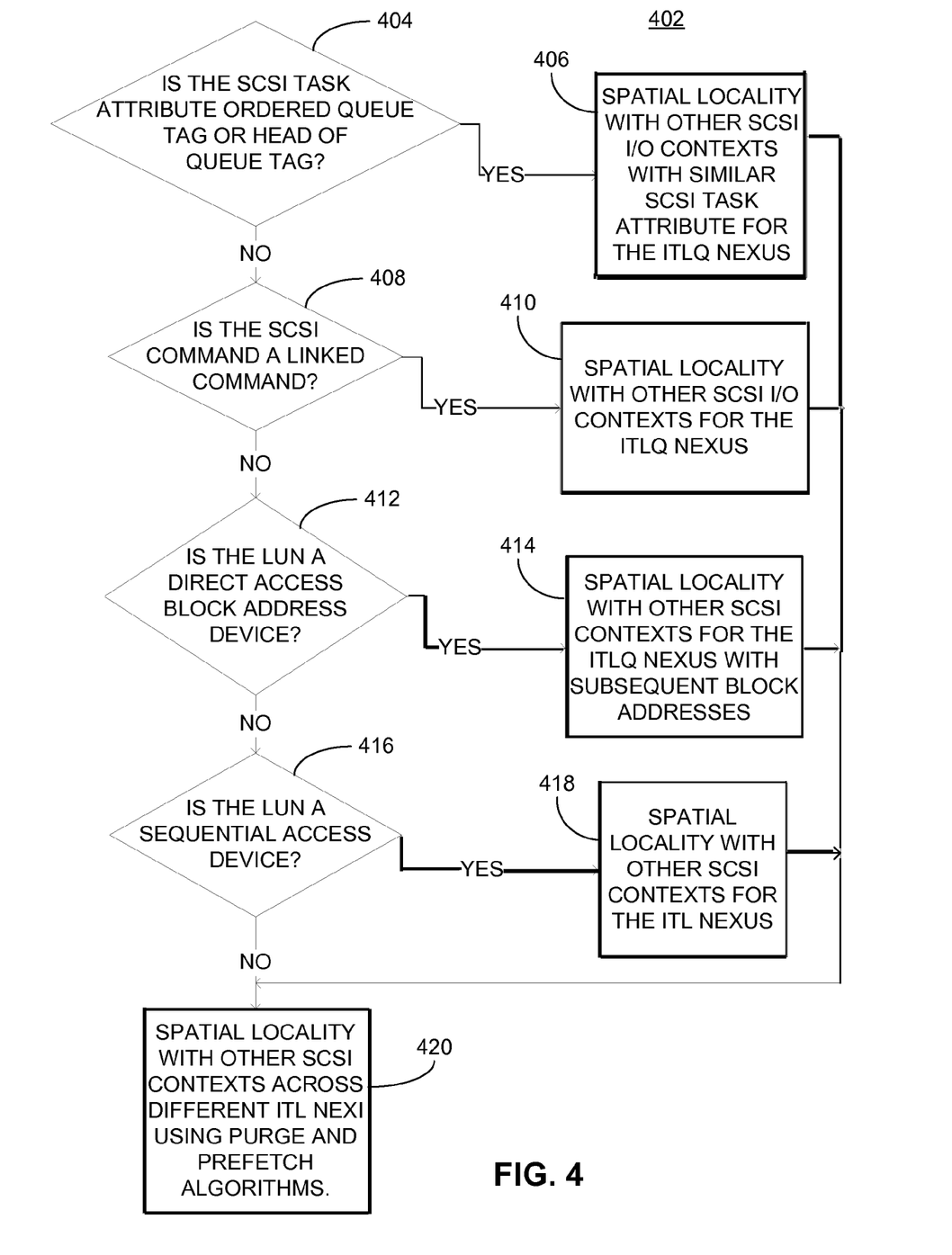
FIG. 4 is a representation of an exemplary logic flow for identification of SCSI I/O spatial locality in an implementation of the apparatus of FIG. 1.

Illustrative approaches for exemplary enforcement of spatial locality criteria by the SCSI I/O coordinator 102 are presented, for explanatory purposes. FIG. 4 is a representation of an exemplary logic flow 402 for identification of SCSI I/O spatial locality in an implementation of the apparatus 100. With respect to ITLQ nexus and ITLQ nexuses, exemplary logic flow 402 in an example relates to SCSI I/O spatial locality identification on a given ITLQ nexus or ITLQ nexuses, for example, based on the SCSI I/O spatial locality attributes. At STEP 404 in an example the SCSI I/O coordinator 102 makes a determination whether the SCSI Task attribute is Ordered Queue Tag or Head of Queue Tag. If yes at STEP 404, at STEP 406 in an example the SCSI I/O coordinator 102 establishes spatial locality with other SCSI I/O contexts with similar SCSI Task attribute for the ITLQ nexus. If no at STEP 404, at STEP 408 in an example the SCSI I/O coordinator 102 makes a determination whether the SCSI command is a linked command. If yes at STEP 408, at STEP 410 in an example the SCSI I/O coordinator 102 establishes spatial locality with other SCSI I/O contexts for the ITLQ nexus. If no at STEP 408, at STEP 412 in an example the SCSI I/O coordinator 102 makes a determination whether the LUN is a direct access block address device. If yes at STEP 412, at STEP 414 in an example the SCSI I/O coordinator 102 establishes spatial locality with other SCSI contexts for the ITLQ nexus with subsequent block addresses. If no at STEP 412, at STEP 416 in an example the SCSI I/O coordinator 102 makes a determination whether the SCSI device server is a sequential access device. If yes at STEP 416, at STEP 418 in an example the SCSI I/O coordinator 102 establishes spatial locality with other SCSI contexts for the ITLQ nexus. If no at STEP 416 or as a progression from STEPS 406, 410, 414, or 418, at STEP 420 in an example the SCSI I/O coordinator 102 establishes spatial locality with other SCSI contexts across different ITLQ nexuses using Purge and Prefetch algorithms and/or approaches.

The SCSI I/O coordinator 102 in an example determines and/or calculates spatial locality based on SCSI I/O timers and spatial locality interval input to the SCSI I/O coordinator 102. An exemplary spatial locality interval specifies a time range within which SCSI I/O completions are expected. The SCSI I/O coordinator 102 in an example receives a spatial locality interval identified by two thresholds: $T_{init\text{-}low}$–Lower threshold for the completion from the current time; and $T_{init\text{-}high}$–Upper threshold for the completion from the current time.

Referring again to FIG. 3, the SCSI I/O coordinator 102 in an example identifies spatial locality through employment of $T_{comp}=T_{post}+T_{rt}$. SCSI I/Os that have: $T_{cur}+T_{init\text{-}low}<=T_{comp}<=T_{cur}+T_{init\text{-}high}$ in an example satisfy the spatial locality interval criterion. An exemplary approach relies on disks such as the storage devices 112 typically scheduling I/Os based on the spatial locality to reduce the seek time. In a case of I/O completions originating from different ITLQ nexuses, an exemplary approach may expand to account for different latencies of the heterogeneous devices as the storage devices 112.

Identification of SCSI I/O spatial locality by the SCSI I/O coordinator 102 in an example may be applied to improve SCSI I/O context cache-hit rate for an exemplary implementation of SCSI I/O context caching using SCSI controller memory. With respect to SCSI I/O context caching, insufficient on-chip memory for storing SCSI I/O contexts may be unsatisfactorily addressed by caching of the on-chip memory contents. Exemplary design constraints for an exemplary SCSI I/O context caching approach follow. It may be desirable that SCSI I/O context caching not result in timeout of I/Os. It may be desirable that I/Os not be starved because of caching. It may be desirable that cache management should reduce and/or minimize additional memory transactions and avoid context cache thrashing. It may be desirable that on a cache miss, an I/O completion not result in controller receive buffer overflow. It may be unsatisfactory to employ FIFO/LIFO/queue based SCSI I/O context caching algorithms and/or approaches in view of context cache thrashing, slower I/O completion rate, unnecessary memory transactions, and/or non-amenability in an exemplary SAN environment.

An exemplary approach for SCSI I/O context caching by and/or with the SCSI I/O coordinator 102 employs the spatial locality of SCSI I/Os, leveraging of the built-in resilience of SCSI Upper Layer Modules 304 in handling completions from reordered I/Os in the SAN fabric 110, and/or reuse of the transport specific flow control mechanics to avoid receive buffer overflow while the SCSI I/O context is retrieved from the host memory 122. SCSI I/O contexts in an example are stored in the host memory 122 and cached on-chip in the SCSI I/O controller memory 120. SCSI I/O requests in an example are set up in the host memory 122. The SCSI I/O coordinator 102 in an example at the SCSI I/O controller 115 employs an exemplary Pull Algorithm and/or approach, for example, designed through employment of the SCSI I/O coordinator 102 to fetch the requests from the host memory 122. The pull algorithm and/or approach in an example functions, works, and/or operates between the host memory 122 and the SCSI I/O coordinator 102. In a further example, the algorithm and/or approach functions, works, and/or operates where the SCSI I/O coordinator 102 is located outside of and/or separate from the SCSI I/O controller 115.

The SCSI driver 128 and/or the server 108 in an example may force-post I/O requests to avoid starvation due to the SCSI I/O controller 115 not pulling the I/Os from the host memory 122. The SCSI initiator 104 and/or the server 108 in an example may inform the SCSI I/O controller 115 about the presence of an I/O request by writing to a memory location on the SCSI I/O controller 115. The semantics of the write may be changed to force-post an I/O request. In exemplary modified semantics, the SCSI I/O controller 115 is mandated to process the I/O request soon after the SCSI initiator 104 and/or the server 108 has written to the memory location on the SCSI I/O controller 115. This enables the SCSI I/O coordinator 102 in an example to push high priority requests through the SCSI I/O controller memory 120. The SCSI I/O coordinator 102 in an example periodically purges and/or enables the SCSI I/O controller 115 to purge the I/O contexts to create room for processing additional SCSI I/O requests. An exemplary SCSI I/O coordinator 102 employs a purge algorithm and/or approach to identify the I/O contexts that may be overwritten without resulting in a cache miss on an I/O completion. On I/O completions, the SCSI I/O coordinator 102 in an example retrieves the I/O contexts to enhance and/or improve the cache hit ratio. An exemplary SCSI I/O coordinator 102 employs a pre-fetch algorithm and/or approach to identify SCSI I/O contexts in the host memory 122 that should be retrieved into the SCSI I/O controller memory 120. On a SCSI I/O context cache miss, the SCSI I/O coordinator 102 in an example employs transport specific flow control (such as Buffer-to-Buffer flow control in Fibre Channel), for example, to prevent overflow of I/O controller receive (Rx) buffers in the transmit/receive (Tx/Rx) data buffer 118 while the SCSI I/O coordinator 102 is retrieving the SCSI I/O context from the host memory 122, as will be appreciated by those skilled in the art.

Illustrative approaches for exemplary SCSI I/O context caching through employment of the SCSI I/O coordinator 102 are presented, for explanatory purposes.

Figure 5:
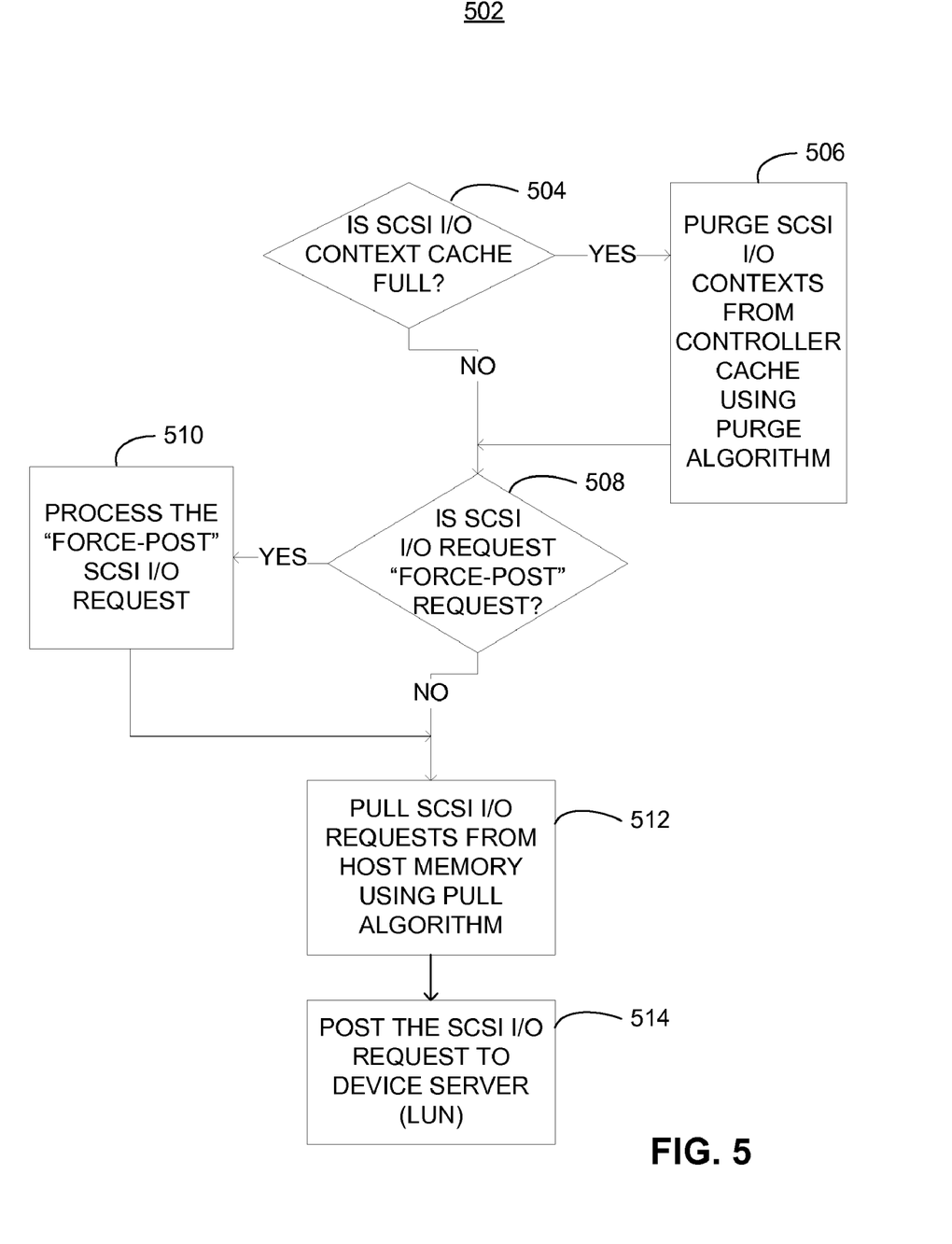
FIG. 5 is a representation of an exemplary logic flow for controller I/O request path in an implementation of the apparatus of FIG. 1.

FIG. 5 is a representation of an exemplary logic flow 502 for controller I/O request path in an implementation of the apparatus 100. At STEP 504, the SCSI I/O coordinator 102 in an example makes a determination whether the SCSI I/O context cache 120 is full. If yes, the SCSI I/O coordinator 102 in an example at STEP 506 purges SCSI I/O contexts from the controller cache 120 using an exemplary purge algorithm and/or approach. At STEP 508, the SCSI I/O coordinator 102 in an example makes a determination whether the SCSI I/O request is a force-post request. If yes, the SCSI I/O coordinator 102 in an example at STEP 510 processes the force-post SCSI I/O request. At STEP 512, the SCSI I/O coordinator 102 in an example pulls the SCSI I/O requests from the host memory 122 using an exemplary pull algorithm and/or approach. At STEP 514, the SCSI I/O coordinator 102 in an example posts the SCSI I/O request to the device server (LUN) as the storage array 114.

Figure 6:
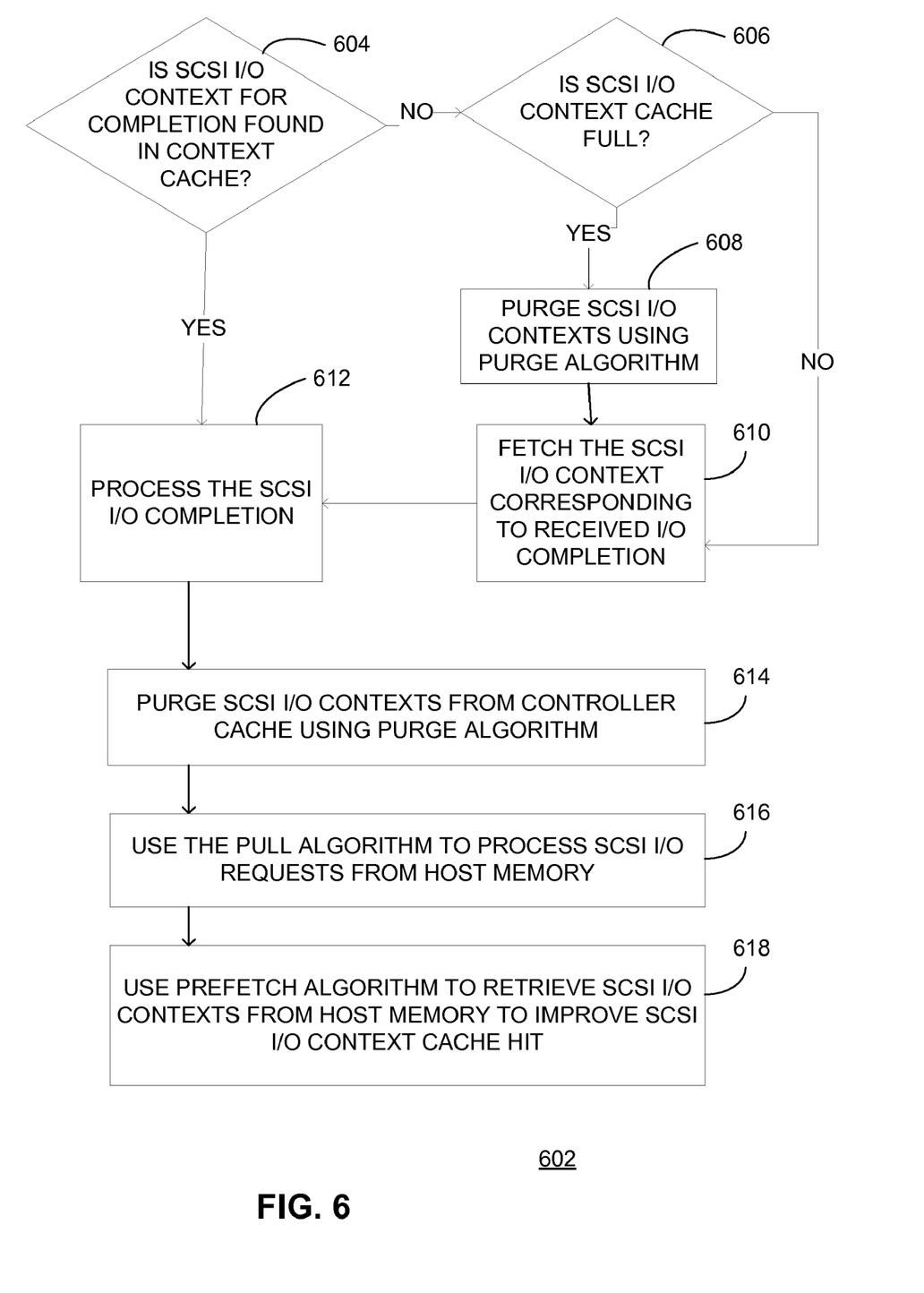
FIG. 6 is a representation of an exemplary logic flow for SCSI I/O completion path in an implementation of the apparatus of FIG. 1.

FIG. 6 is a representation of an exemplary logic flow 602 for SCSI I/O completion path in an implementation of the apparatus 100. At STEP 604, the SCSI I/O coordinator 102 in an example makes a determination whether the SCSI I/O context for an I/O completion is found and/or located in the SCSI I/O context cache 120. If yes, the SCSI I/O coordinator 102 in an example at STEP 606 makes a determination whether the SCSI I/O context cache 120 is full, for example, on the I/O controller 115, in an implementation of the SCSI I/O coordinator 102 on the I/O controller 115. If yes, the SCSI I/O coordinator 102 in an example at STEP 608 purges SCSI I/O contexts using an exemplary purge algorithm and/or approach, and at STEP 610 fetches the SCSI I/O context corresponding to the received I/O completion. At STEP 612, the SCSI I/O coordinator 102 in an example processes the SCSI I/O completion. At STEP 614, the SCSI I/O coordinator 102 in an example purges SCSI I/O contexts from the SCSI I/O context cache 120 using an exemplary purge algorithm and/or approach. At STEP 616, the SCSI I/O coordinator 102 in an example uses an exemplary pull algorithm and/or approach to process SCSI I/O requests from the host memory 122. At STEP 618, the SCSI I/O coordinator 102 in an example uses an exemplary prefetch algorithm and/or approach to retrieve SCSI I/O contexts from the SCSI I/O context buffer 124 on the host memory 122 to improve SCSI I/O context cache hit in the context cache 120.

Figure 7:
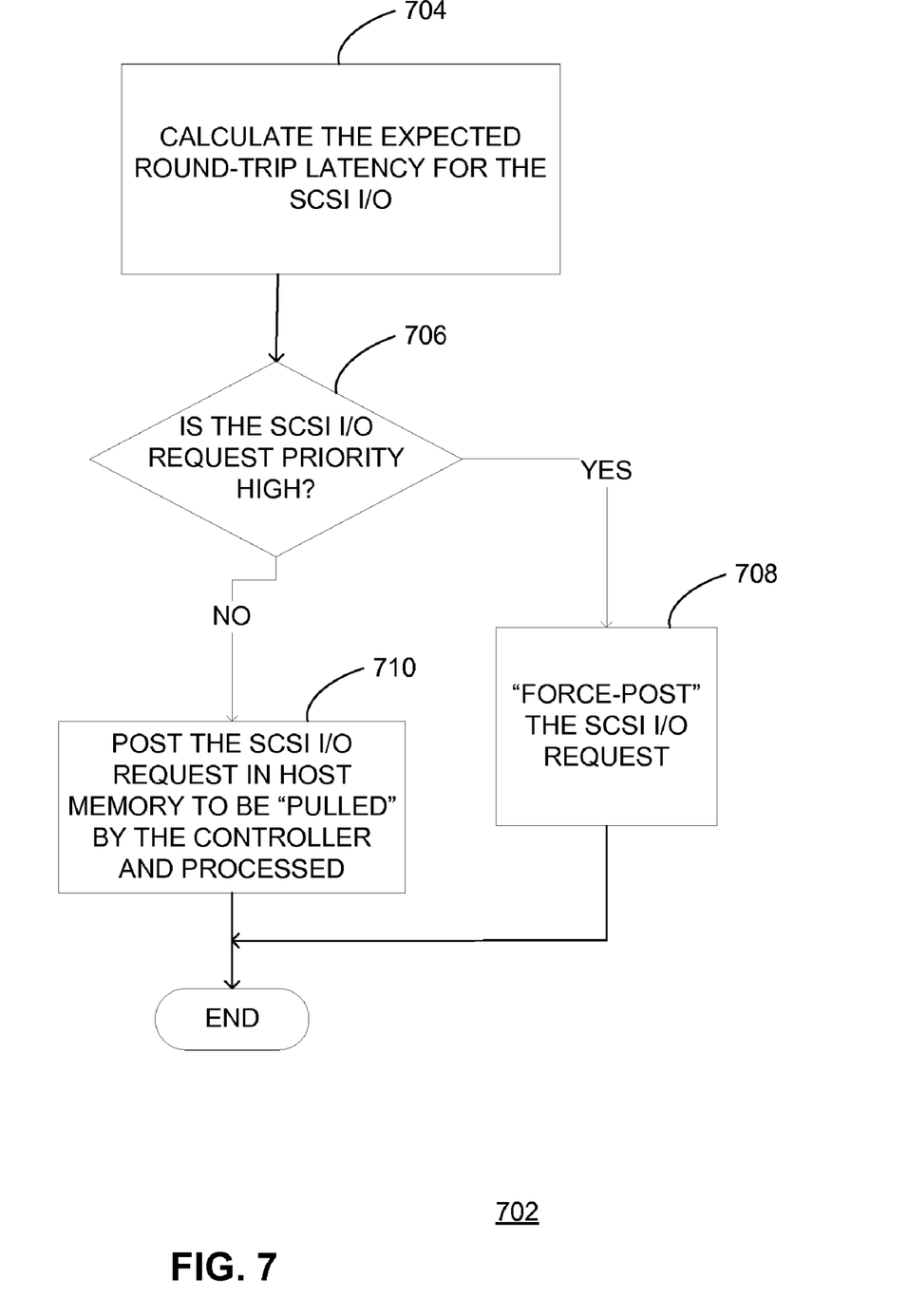
FIG. 7 is a representation of an exemplary logic flow for SCSI I/O request from host driver in an implementation of the apparatus of FIG. 1.

FIG. 7 is a representation of an exemplary logic flow 702 for SCSI I/O request from host driver in an implementation of the apparatus 100. At STEP 704, the SCSI I/O coordinator 102 in an example calculates an expected round-trip latency for the SCSI I/O. The round trip latency is passed to the SCSI I/O coordinator 102 as a parameter in the SCSI I/O context. At STEP 706, the SCSI I/O coordinator 102 in an example makes a determination whether the SCSI I/O request priority is high. If yes, the SCSI I/O coordinator 102 in an example at STEP 708 force-posts the SCSI I/O request. If no, the SCSI I/O coordinator 102 in an example at STEP 710 posts the SCSI I/O request in the host memory 122 to be pulled by the SCSI I/O controller 115 and processed.

An exemplary implementation comprises a Small Computer System Interface (SCSI) input/output (I/O) coordinator 102 that caches in memory 120 local to the SCSI I/O coordinator 102 one or more I/O request contexts stored in memory 124 non-local to the SCSI I/O coordinator 102.

A plurality of I/O request contexts comprises the one or more I/O request contexts. The SCSI I/O coordinator 102 associates the plurality of I/O request contexts with a plurality of respective I/O requests. The SCSI I/O coordinator 102 identifies one or more patterns of spatial locality in the plurality of I/O requests. The SCSI I/O coordinator 102 groups one or more sets of I/O requests from the plurality of I/O requests based on spatial locality. The SCSI I/O coordinator 102 groups one or more sets of I/O requests from the plurality of I/O requests based on one or more of device latency and/or command latency associated with the one or more sets of I/O requests.

The SCSI I/O coordinator 102 creates a plurality of sets of I/O requests from the plurality of I/O requests as heterogeneous I/O traffic based on a first category of high storage device latency and high I/O command latency, a second category of high storage device latency and low I/O command latency, a third category of low storage device latency and high I/O command latency, and a fourth category of low storage device latency and low I/O command latency. The SCSI I/O coordinator 102 prioritizes among the plurality of sets of I/O requests to positively affect performance of I/O traffic in the fourth category of low storage device latency and low I/O command latency. The plurality of I/O requests comprise SCSI I/O requests of different characteristics that comprise command type, targeted SCSI device type, SCSI task attributes, device latencies, and command latencies. The SCSI I/O coordinator 102 receives the SCSI I/O requests and spatial locality criteria as inputs. The SCSI I/O coordinator 102 identifies spatial locality among the SCSI I/O requests subject to the spatial locality criteria, wherein the SCSI I/O coordinator 102 employs the spatial locality to group the SCSI I/O requests into the first category of high storage device latency and high I/O command latency, the second category of high storage device latency and low I/O command latency, the third category of low storage device latency and high I/O command latency, and the fourth category of low storage device latency and low I/O command latency. The SCSI I/O coordinator 102 employs the spatial locality to reorder and/or prioritize the SCSI I/O requests.

The SCSI I/O creates a plurality of sets of I/O requests from the plurality of I/O requests based on categorization by one or more storage access patterns associated with the plurality of sets of I/O requests. The one or more storage access patterns associated with the plurality of sets of I/O requests comprise a sequential access pattern from a characteristic of one or more data intensive computer programs 126 and/or a plurality of targets 103 that correspond to the plurality of sets of I/O requests. The SCSI I/O coordinator 102 creates the plurality of sets of I/O requests from the plurality of I/O requests based on the sequential access pattern from the characteristic of the one or more data intensive computer programs 126 and/or the plurality of targets 103 that correspond to the plurality of sets of I/O requests. The one or more data intensive computer programs 126 comprise one or more user-level data intensive computer applications. The one or more storage access patterns associated with the plurality of sets of I/O requests comprise the sequential access pattern from a characteristic of the one or more user-level data intensive computer applications and the plurality of targets 103 that correspond to the plurality of sets of I/O requests. The SCSI I/O coordinator 102 creates the plurality of sets of I/O requests from the plurality of I/O requests based on the sequential access pattern from the characteristic of the one or more user-level data intensive computer applications and the plurality of targets 103 that correspond to the plurality of sets of I/O requests.

The SCSI I/O coordinator 102 makes a determination that one or more I/O requests among the plurality of I/O requests deserve higher priority as higher-priority I/O requests. The SCSI I/O coordinator 102 changes an ordering of attention to a number of pending I/O requests of the plurality of I/O requests to give the higher priority to the higher-priority I/O requests. The SCSI I/O coordinator 102 controls a quality of service (QoS) through placement of one or more higher-priority I/O requests of the plurality of I/O requests ahead of one or more lower-priority and already-pending I/O requests of the plurality of I/O requests.

An exemplary implementation comprises a Small Computer System Interface (SCSI) input/output (I/O) coordinator 102 that purges from memory 120 local to the SCSI I/O coordinator 102 one or more I/O request contexts stored in memory 124 non-local to the SCSI I/O coordinator 102 to make room in the memory 120 local to the SCSI I/O coordinator 102 for one or more additional I/O request contexts more-recently stored in the memory 124 non-local to the SCSI I/O coordinator 102.

A plurality of I/O request contexts comprises the one or more I/O request contexts. The SCSI I/O coordinator 102 associates the plurality of I/O request contexts with a plurality of respective I/O requests. The SCSI I/O identifies one or more I/O requests of the plurality of I/O requests through employment of one or more respective initiator/target/logical unit/queue (ITLQ) nexuses. The SCSI I/O identifies the plurality of I/O requests through employment of a respective plurality of initiator/target/logical unit/queue (ITLQ) nexuses. The SCSI I/O coordinator 102 identifies spatial locality within a particular ITLQ nexus of the plurality of ITLQ nexuses and across different ITLQ nexuses of the plurality of ITLQ nexuses. The SCSI I/O identifies one or more I/O requests of the plurality of I/O requests with one or more respective nexuses that comprise corresponding indications of a block address for target data of each I/O request of the one or more I/O requests, storage device type for the target data of each I/O request of the one or more I/O requests, and SCSI command attributes for each I/O request of the one or more I/O requests.

An exemplary implementation comprises a Small Computer System Interface (SCSI) input/output (I/O) coordinator 102 that applies spatial locality criteria to improve cache hit rate in memory 120 local to the SCSI I/O coordinator 102 for of one or more I/O request contexts stored in memory 124 non-local to the SCSI I/O coordinator 102.

Upon a cache miss for one or more of the of one or more I/O request contexts in the memory 120 local to the SCSI I/O coordinator 102, the SCSI I/O coordinator 102 retrieves the one or more of the of one or more I/O request contexts from the memory 124 non-local to the SCSI I/O coordinator 102. A plurality of I/O request contexts comprises the one or more I/O request contexts. The SCSI I/O coordinator 102 associates the plurality of I/O request contexts with a plurality of respective I/O requests. The SCSI I/O coordinator 102 identifies spatial locality in one or more of the plurality of I/O requests through employment of one or more of SCSI command type, SCSI device type, SCSI task attribute, and/or SCSI transport factor.

The SCSI I/O coordinator 102 employs as the spatial locality criteria one or more of a specific ITLQ nexus that allows the SCSI I/O coordinator 102 to identify spatial locality for any particular ITLQ nexus, a set of ITLQ nexuses that allows the SCSI I/O coordinator 102 to identify spatial locality on a per-ITLQ nexus for a plurality of ITLQ nexuses, SCSI command operational code that allows the SCSI I/O coordinator 102 to identify spatial locality among I/O requests of the plurality of I/O requests that comprise the command operational code, SCSI device type that allows the SCSI I/O coordinator 102 to identify spatial locality among I/O requests of the plurality of I/O requests that are targeted to the SCSI Device type, SCSI I/O timer rules that allow the SCSI I/O coordinator 102 to identify spatial locality among I/O requests of the plurality of I/O requests, and/or spatial locality interval that allows the SCSI I/O coordinator 102 to identify spatial locality for I/O requests of the plurality of I/O requests that are expected to complete within the spatial locality interval across different ITLQ nexuses.

An implementation of the apparatus 100 in an example comprises a plurality of components such as one or more of electronic components, mechanical components, hardware components, and/or computer software components. A number of such components can be combined or divided in an implementation of the apparatus 100. An exemplary component of an implementation of the apparatus 100 employs and/or comprises a set and/or series of computer instructions written in or implemented with any of a number of programming languages, as will be appreciated by those skilled in the art.

An implementation of the apparatus 100 in an example encompasses an article. The article comprises one or more computer-readable signal-bearing media. The article comprises means in the one or more media for performing steps and/or functions. An implementation of the apparatus 100 in an example employs one or more computer readable signal bearing media. A computer-readable signal-bearing medium in an example stores software, firmware and/or assembly language for performing one or more portions of one or more implementations. An example of a computer-readable signal bearing medium for an implementation of the apparatus 100 comprises a recordable data storage medium such as one or more of the SCSI target 103, the Storage Area Network (SAN) fabric 110, the storage devices 112, the storage array 114, the transmit/receive (Tx/Rx) data buffer 118, the context memory and/or SCSI I/O controller cache and/or memory 120, the host memory 122, the SCSI I/O context buffer 124, and/or the buffer 130. A computer-readable signal-bearing medium for an implementation of the apparatus 100 in an example comprises one or more of a magnetic, electrical, optical, biological, and/or atomic data storage medium. For example, an implementation of the computer-readable signal-bearing medium comprises one or more floppy disks, magnetic tapes, CDs, DVDs, hard disk drives, and/or electronic memory. In another example, an implementation of the computer-readable signal-bearing medium comprises a modulated carrier signal transmitted over a network comprising or coupled with an implementation of the apparatus 100, for instance, one or more of a telephone network, a local area network ("LAN"), a wide area network ("WAN"), the Internet, and/or a wireless network.

The steps or operations described herein are examples. There may be variations to these steps or operations without departing from the spirit of the invention. For example, the steps may be performed in a differing order, or steps may be added, deleted, or modified.

Although exemplary implementation of the invention has been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. An apparatus, comprising:
    a Small Computer System Interface (SCSI) input/output (I/O) coordinator that caches in memory local to the SCSI I/O coordinator a plurality of I/O request contexts stored in memory non-local to the SCSI I/O coordinator;
    wherein the SCSI I/O coordinator associates the plurality of I/O request contexts with a plurality of respective I/O requests, wherein the SCSI I/O coordinator groups one or more sets of I/O requests from the plurality of I/O requests based on one or more of device latency and/or command latency associated with the one or more sets of I/O requests.

2. An apparatus, comprising:
    a Small Computer System Interface (SCSI) input/output (I/O) coordinator that caches in memory local to the SCSI I/O coordinator a plurality of I/O request contexts stored in memory non-local to the SCSI I/O coordinator;
    wherein the SCSI I/O coordinator associates the plurality of I/O request contexts with a plurality of respective I/O requests, wherein the SCSI I/O coordinator creates a plurality of sets of I/O requests from the plurality of I/O requests as heterogeneous I/O traffic based on a first category of high storage device latency and high I/O command latency, a second category of high storage device latency and low I/O command latency, a third category of low storage device latency and high I/O command latency, and a fourth category of low storage device latency and low I/O command latency.

3. The apparatus of claim 2, wherein the SCSI I/O coordinator prioritizes among the plurality of sets of I/O requests to positively affect performance of I/O traffic in the fourth category of low storage device latency and low I/O command latency.

4. The apparatus of claim 2, wherein the plurality of I/O requests comprise SCSI I/O requests of different characteristics that comprise command type, targeted SCSI device type, SCSI task attributes, device latencies, and command latencies;
  wherein the SCSI I/O coordinator receives the SCSI I/O requests and spatial locality criteria as inputs, wherein the SCSI I/O coordinator identifies spatial locality among the SCSI I/O requests subject to the spatial locality criteria, wherein the SCSI I/O coordinator employs the spatial locality to group the SCSI I/O requests into the first category of high storage device latency and high I/O command latency, the second category of high storage device latency and low I/O command latency, the third category of low storage device latency and high I/O command latency, and the fourth category of low storage device latency and low I/O command latency;
  wherein the SCSI I/O coordinator employs the spatial locality to reorder and/or prioritize the SCSI I/O requests.

5. An apparatus, comprising:
  a Small Computer System Interface (SCSI) input/output (I/O) coordinator that caches in memory local to the SCSI I/O coordinator a plurality of I/O request contexts stored in memory non-local to the SCSI I/O coordinator;
  wherein the SCSI I/O coordinator associates the plurality of I/O request contexts with a plurality of respective I/O requests, wherein the SCSI I/O coordinator creates a plurality of sets of I/O requests from the plurality of I/O requests based on categorization by one or more storage access patterns associated with the plurality of sets of I/O requests.

6. The apparatus of claim 5, wherein the one or more storage access patterns associated with the plurality of sets of I/O requests comprise a sequential access pattern from a characteristic of one or more data intensive computer programs and/or a plurality of targets that correspond to the plurality of sets of I/O requests; wherein the SCSI I/O coordinator creates the plurality of sets of I/O requests from the plurality of I/O requests based on the sequential access pattern from the characteristic of the one or more data intensive computer programs and/or the plurality of targets that correspond to the plurality of sets of I/O requests.

7. The apparatus of claim 6, wherein the one or more data intensive computer programs comprise one or more user-level data intensive computer applications;
  wherein the one or more storage access patterns associated with the plurality of sets of I/O requests comprise the sequential access pattern from a characteristic of the one or more user-level data intensive computer applications and the plurality of targets that correspond to the plurality of sets of I/O requests;
  wherein the SCSI I/O coordinator creates the plurality of sets of I/O requests from the plurality of I/O requests based on the sequential access pattern from the characteristic of the one or more user-level data intensive computer applications and the plurality of targets that correspond to the plurality of sets of I/O requests.

8. An apparatus, comprising:
  a Small Computer System Interface (SCSI) input/output (I/O) coordinator that caches in memory local to the SCSI I/O coordinator a plurality of I/O request contexts stored in memory non-local to the SCSI I/O coordinator;
  wherein the SCSI I/O coordinator associates the plurality of I/O request contexts with a plurality of respective I/O requests, wherein the SCSI I/O coordinator makes a determination that one or more I/O requests among the plurality of I/O requests deserve higher priority as higher-priority I/O requests, wherein the SCSI I/O coordinator changes an ordering of attention to a number of pending I/O requests of the plurality of I/O requests to give the higher priority to the higher-priority I/O requests.

9. An apparatus, comprising:
  a Small Computer System Interface (SCSI) input/output (I/O) coordinator that caches in memory local to the SCSI I/O coordinator a plurality of I/O request contexts stored in memory non-local to the SCSI I/O coordinator;
  wherein the SCSI I/O coordinator associates the plurality of I/O request contexts with a plurality of respective I/O requests, wherein the SCSI I/O coordinator controls a quality of service (QoS) through placement of one or more higher-priority I/O requests of the plurality of I/O requests ahead of one or more lower-priority and already-pending I/O requests of the plurality of I/O requests.

10. An apparatus, comprising:
  a Small Computer System Interface (SCSI) input/output (I/O) coordinator that applies spatial locality criteria to improve cache hit rate in memory local to the SCSI I/O coordinator for a plurality of I/O request contexts stored in memory non-local to the SCSI I/O coordinator;
  wherein the SCSI I/O coordinator associates the plurality of I/O request contexts with a plurality of respective I/O requests, wherein the SCSI I/O coordinator identifies spatial locality in one or more of the plurality of I/O requests through employment of one or more of SCSI command type, SCSI device type, SCSI task attribute, and/or SCSI transport factor.

11. An apparatus, comprising:
  a Small Computer System Interface (SCSI) input/output (I/O) coordinator that applies spatial locality criteria to improve cache hit rate in memory local to the SCSI I/O coordinator for a plurality of I/O request contexts stored in memory non-local to the SCSI I/O coordinator;
  wherein the SCSI I/O coordinator associates the plurality of I/O request contexts with a plurality of respective I/O requests, wherein the SCSI I/O coordinator employs as the spatial locality criteria one or more of a specific ITLQ nexus that allows the SCSI I/O coordinator to identify spatial locality for any particular ITLQ nexus, a set of ITLQ nexuses that allows the SCSI I/O coordinator to identify spatial locality on a per-ITLQ nexus for a plurality of ITLQ nexuses, SCSI command operational code that allows the SCSI I/O coordinator to identify spatial locality among I/O requests of the plurality of I/O requests that comprise the command operational code, SCSI device type that allows the SCSI I/O coordinator to identify spatial locality among I/O requests of the plurality of I/O requests that are targeted to the SCSI Device type, SCSI I/O timer rules that allow the SCSI I/O coordinator to identify spatial locality among I/O requests of the plurality of I/O requests, and/or spatial locality interval that allows the SCSI I/O coordinator to identify spatial locality for I/O requests of the plurality of I/O requests that are expected to complete within the spatial locality interval across different ITLQ nexuses.

* * * * *

UNITED STATES PATENT AND TRADEMARK OFFICE
CERTIFICATE OF CORRECTION

PATENT NO. : 7,644,204 B2  Page 1 of 1
APPLICATION NO. : 11/554838
DATED : January 5, 2010
INVENTOR(S) : Gunneswara R. Marripudi et al.

It is certified that error appears in the above-identified patent and that said Letters Patent is hereby corrected as shown below:

In column 18, line 13, in Claim 9, delete "apparatus." and insert -- apparatus, --, therefor.

In column 18, line 26, in Claim 10, delete "apparatus." and insert -- apparatus, --, therefor.

Signed and Sealed this

Twenty-second Day of June, 2010

David J. Kappos
*Director of the United States Patent and Trademark Office*